Jan. 8, 1963 R. G. FERRIS 3,071,825
SYSTEM FOR HANDLING TRACK SUSPENDED OBJECTS
Filed Sept. 17, 1958 8 Sheets-Sheet 1

Inventor:
Robert G. Ferris
By: Schroeder, Hofgren,
Brady & Wegner
Attorneys

Jan. 8, 1963 R. G. FERRIS 3,071,825
SYSTEM FOR HANDLING TRACK SUSPENDED OBJECTS
Filed Sept. 17, 1958 8 Sheets-Sheet 2

Inventor:
Robert G. Ferris
By: Schroeder, Hofgren,
Brady & Wegner
Attorneys

Jan. 8, 1963 R. G. FERRIS 3,071,825
SYSTEM FOR HANDLING TRACK SUSPENDED OBJECTS
Filed Sept. 17, 1958 8 Sheets-Sheet 6

Inventor:
Robert G. Ferris
By Schroeder, Hofgren,
Brady & Wegner
Attorneys

United States Patent Office 3,071,825
Patented Jan. 8, 1963

3,071,825
SYSTEM FOR HANDLING TRACK SUSPENDED OBJECTS
Robert G. Ferris, Harvard, Ill., assignor to Starline, Inc., a corporation of Illinois
Filed Sept. 17, 1958, Ser. No. 761,488
3 Claims. (Cl. 20—19)

This invention relates to a system for handling track suspended movable objects such as doors and partition panels, or conveying other track suspended articles, and more particularly to such a system including article suspending track structure which embodies a track curve for selectively permitting a trolley to travel along a straight main track or to travel onto a track diverging from the main track in which the curve has no moving parts and it is only necessary to apply directional force to a trolley traveling onto the diverging track.

In the past, doors or partition panels have been suspended from overhead tracks by means of trolleys in which it has been necessary, when directing trolleys between one of two different tracks, to provide either movable switch mechanism or track sections in association with the overhead tracks to direct a trolley to one or the other of the different tracks. This has resulted in structure which, because of the movable track or switch parts, is subject to breakdown and failure of parts as well as regular maintenance problems. An example of the pivoted track section for guiding trolleys between one of two tracks is shown in Patent No. 1,774,877 to H. J. Ferris.

Also, in some prior constructions the door is associated with an overhead track but has its weight carried by trolleys at its lower end engageable in tracks in a floor or other surface. The overhead track merely guides the door or panel to a desired branch track and does not support the door. Such constructions are inherently faulty because of the ease with which dirt and other foreign matter may collect in the floor tracks and cause malfunctioning of the mechanism.

The system of the present invention eliminates the necessity of floor tracks and either movable track sections or pivoted switch members. It is only necessary to exert directional force on the trolley which is to be diverted from a straight path.

Another disadvantage of previous systems utilizing movable switch mechanisms is the failure of safety mechanisms to prevent a trolley from running off an open switch. This commonly occurs as safety devices stick or otherwise become inoperative.

Some examples of prior constructions which are unsatisfactory for the foregoing reasons are shown in the following patents:

| Patent No. | Country | Date Patented |
|---|---|---|
| 374,684 | Italy | September 5, 1939 |
| 568,332 | France | December 20, 1923 |
| 624,907 | Germany | January 30, 1936 |
| 679,094 | Germany | July 28, 1939 |
| 814,568 | France | March 22, 1937 |
| 942,965 | Germany | May 9, 1956 |
| 955,968 | France | July 4, 1949 |

In the following description, reference is made to tubular track which, in its broadest sense, includes track having a square cross-section as well as other shapes in addition to a cylindrical shape.

The system of the present invention embdies a track curve in which a straight section thereof forms a first branch track constituting a continuation of the main track, and a second branch track curvingly diverges from the first branch. The branch tracks as well as the main track have a tubular cross section with a slot extending lengthwise on the underside thereof with the two branch track slots merging into the slot of the main track. The contiguous sections of the branch track undersides taper to an end at the junction of the branch track slots and provide continuing support to the trolley wheels at the slot junction. The wheels normally engage the track at opposite sides of the track slot. With this construction, the trolleys follow a straight path in the tubular track, and it is necessary to exert directional force on the leading wheel of the trolley if the trolley is to move onto the diverging branch track. More particularly, the track has a circular cross section and each of the trolley wheels has generally an oblate spheroid shape. Each of the trolleys to be diverted onto the diverging branch track may have force magneticaly exerted thereon to produce the desired diversion, or may carry a cam follower positioned to engage cam means disposed adjacent the slot junction to direct the lead trolley wheel onto the diverging branch track.

In an embodiment of the system of the present invention, a series of door sections are each supported from an overhead track by a trolley for travel between a position extending across an opening and a storage position at an angle to the first position. Each of the door trolleys which changes direction in traveling from the storage position to the position across the opening by traveling along the diverging branch of the track curve is provided with a cam follower to cause the trolley to follow the diverging branch while a trolley continuing in a straight path does not have a cam follower. The cam that is followed by the successive cam followers may be the exterior surface of the diverging branch track. This construction differs from prior constructions in avoiding the use of a pivoted track section or a pivoted switch member for selectively permitting the travel of a trolley either straight ahead or on a diverging branch track.

In the system of the present invention in another embodiment, a series of doors or partition panels are each supported by a pair of spaced apart trolleys and an overhead track and may be moved from in line positions to a storage area in which they are stacked up one in front of the other without any movably mounted structure associated with the track. This differs from the prior art in enabling a leading trolley of each door to move past a track curve having a branch track, and the trailing trolley of a door to move onto the branch track of the curve so as to stack the doors one in front of the other on a pair of spaced parallel storage tracks without the use of pivoted track sections or pivoted switch members. The lack of the pivoted track sections or switch members is extremely important when the supported doors are of a substantial size and weight because the supporting track must have strength to support the load. A pivoted track section constitutes a weak link in the track system.

As stated previously, the cam co-acting with a cam follower on a trolley may be the external surface of the diverging branch track of a track curve or, alternatively, the cam may be a separate member, and selectivity in determining when a trolley shall move onto a branch track is determined either by having the cam selectively positionable in an operating position or by having the cam follower selectively positionable in an operating position. These arrangements, in addition to the use of magnetic attraction for diverting a trolley onto a diverging branch track, provide a highly versatile article supporting system in which the system may include many track curves each having one or more diverging branch tracks, and a trolley will continue along a straight path until a diverting force is exerted thereon.

Still another feature of the present invention is the utilization of a main track embodying a series of track curves, each with a diverging storage branch track, all of which are congruent and spaced apart from each other, as well as a branch track forming a continuation of the main track. The first branch tracks each have a cam associated therewith at its own distinct level, and the trolleys that are to be diverted onto one or the other of the first branch tracks have a cam follower disposed at a level to co-act with the cam of the particular branch track. This enables the placing of alternate doors or panels in storage positions in adjacent pairs of storage tracks. This arrangement also enables the support of a pair of doors of substantial weight having trolleys of substantial length by a first and a third branch track and a second and fourth branch track, respectively, so as to not have the trolleys of adjacent doors on the same storage tracks.

The invention is illustrated in the accompanying drawings in which.

Figures 1, 3:
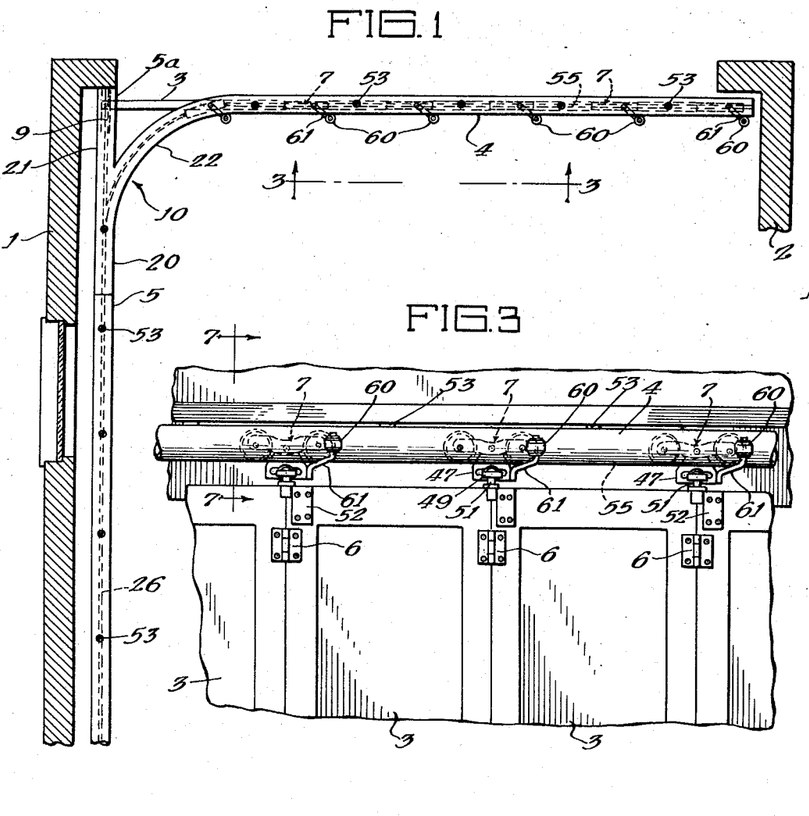
FIG. 1 is a fragmentary plan section of a building structure with the door panels spanning an opening in the building and showing the door supporting track structure of the present invention.
FIG. 3 is an enlarged fragmentary front elevational view of the doors and shows the supporting structure thereof constructed in accordance with the present invention and taken generally along the line 3—3 in FIG. 1.
Figure 2:
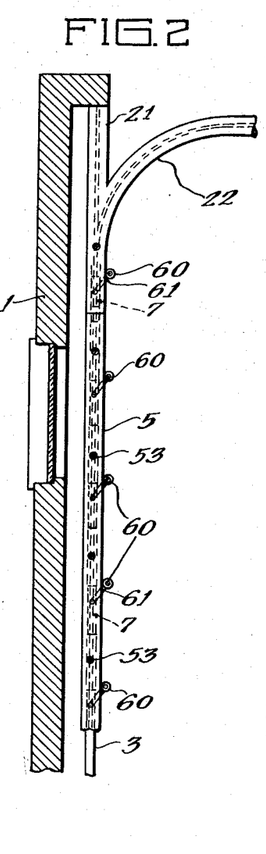
FIG. 2 is a fragmentary plan section similar to FIG. 1, but showing the doors in a storage position along a wall of the building.

Referring to the drawings in more detail and particularly to FIGS. 1 to 3, a building structure has walls 1 and 2 spaced apart by an opening which is closeable by a series of door sections 3 which are suspended by a track system including a first track 4 spanning the opening between the building walls 1 and 2, and which supports the door sections in positions to close the opening as shown in FIG. 1. A second track 5 is disposed along the wall 1 of the building to provide a storage area for the door sections 3 when the are in a stored out-of-use position, as shown in FIG. 2. The door sections 3 are pivotally interconnected by hinges 6, and are hung from the tracks 4 and 5 by hangers having trolleys 7 associated one with each door at the point of pivoting thereof to an adjacent door and adjacent the leading end of the lead door appearing at the right-hand side of FIG. 1. The trailing end of the trailing door, appearing at the left in FIG. 1, has a trolley 9 which is at all times supported by the track 5, and with the door sections in closed position, as shown in FIG. 1, is supported by an end 5a of the storage track 5.

The system of FIGS. 1 to 3 embodies the hanger and track assembly of this invention and, more particularly, the track curve indicated generally at 10 which enables all of the trolleys 7, except for the trolley 9 at the trailing end of the trailing door section, to move onto the track 4 when moved to closed position while permitting the trailing trolley 9 of the trailing door section to pass beyond the curve to the end 5a of the track 5.

Figures 8, 9, 10, 11:
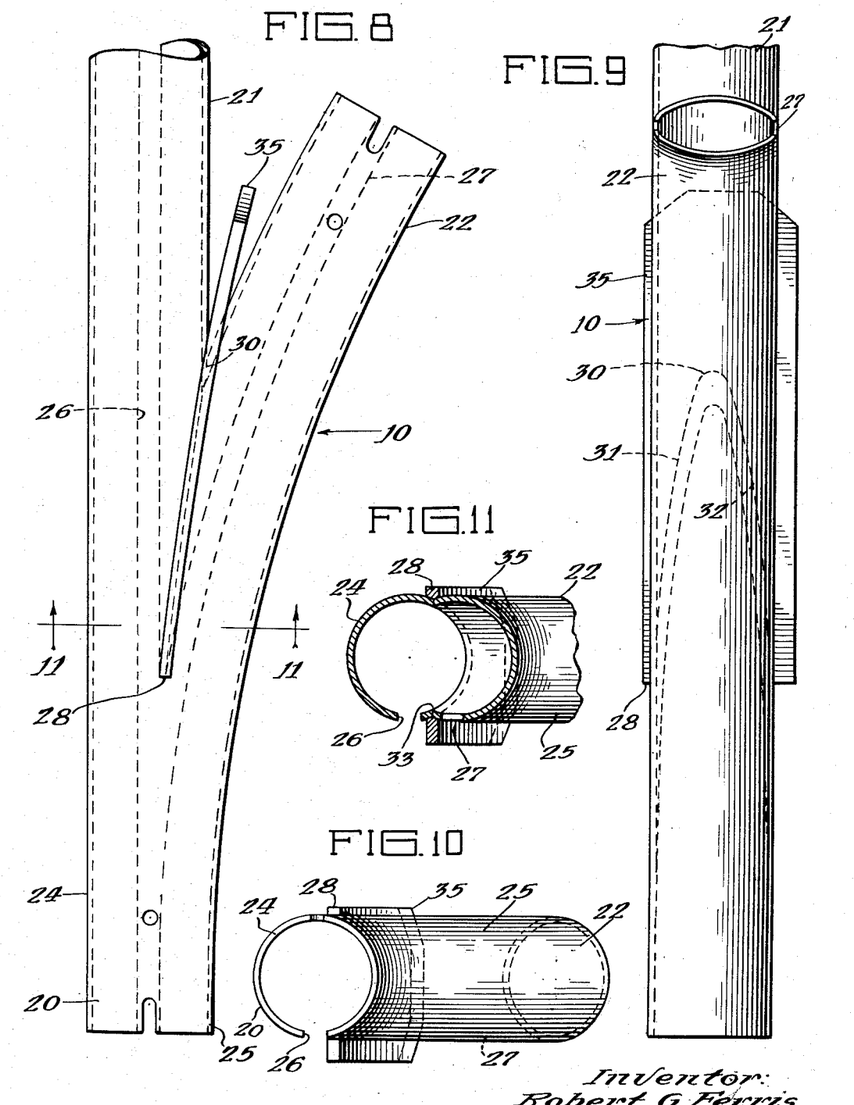
FIG. 8 is a fragmentary plan view of the track curve of the present invention.
FIG. 9 is an elevational view of the curve shown in FIG. 8.
FIG. 10 is an end elevational view of the curve looking toward the bottom of the curve as shown in FIG. 8.
FIG. 11 is a vertical section taken generally along the line 11—11 in FIG. 8.

Reference may now be had to FIGS. 5 to 10 for a description of the hanger and track assembly including the track curve 10. All of the track, including that of the track curve 10, has a tubular cross section and, more particularly, a circular cross-section and is provided with a slot extending lengthwise along the underside thereof. As shown in FIG. 8, the curve 10 has a main line track section 20 and a first branch track section 21 in straight line relation with the main line track section 20, and a second branch track section 22 which curvingly diverges from the first branch track section 21 at a fork. The main track section has a generally tubular wall with a side part 24 continuing along the straight side of the track curve to form a side part of the first branch track section 21, while another side part 25 of the wall has a curve therein to form one side part of the wall of the second branch track section 22. A slot 26 extending lengthwise of the main track section continues along a straight line to also constitute the slot of the first branch track section 21 and a slot 27 extending lengthwise on the underside of the second branch track section 22 merges with the slot 26 at a junction, indicated at 28. A shape is produced by the merging of the branch track sections 21 and 22 in which the adjacent sides of the track section walls merge initially at a point 30, and the line of contact between the two track sections moves upwardly and downwardly as shown by the broken lines 31 and 32 to provide at the underside of the curve a common segment 33 of the two section walls which terminates in an end at the merger point or junction of the slots 26 and 27.

A brace in the form of a plate 35 is shaped to engage the line of merger of the branch track section walls and is welded thereto to strengthen the joint between said track sections. This brace transmits force through the entire connection to provide a rigid structure.

Figures 4, 5, 6, 7:
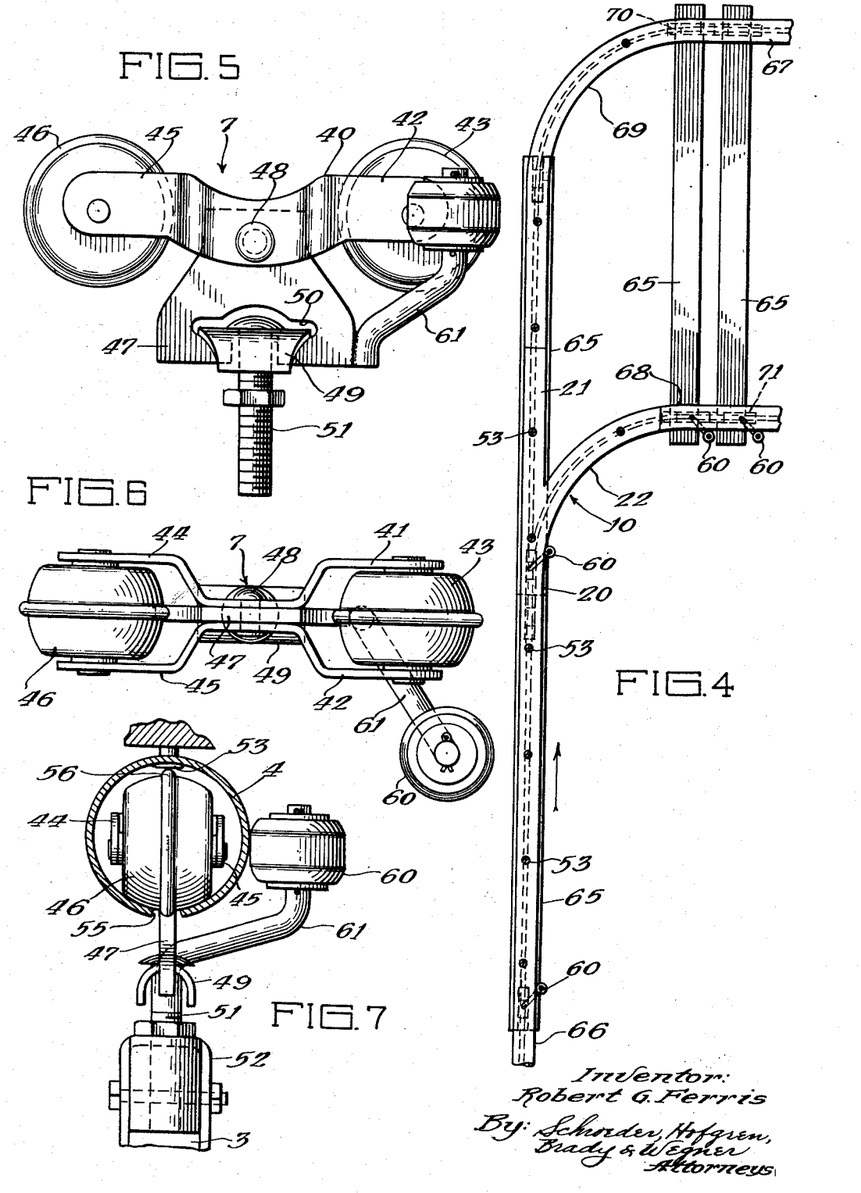
FIG. 4 is a fragmentary plan view of the system in an embodiment wherein the doors are disposed in line and may be moved to a storage position stacked one in front of the other.
FIG. 5 is an enlarged front elevational view of a trolley constructed in accordance with the present invention.
FIG. 6 is a plan view of the trolley shown in FIG. 5.
FIG. 7 is a vertical section on an enlarged scale taken generally along the line 7—7 in FIG. 3 and showing the trolley in end elevation.

The trolley component of the track and trolley assembly is shown particularly in FIGS. 5 to 7 in which the trolley hanger comprises a truck 40 having a first pair of spaced apart legs 41 and 42 rotatably supporting a wheel 43 and a second pair of spaced apart legs 44 and 45 rotatably supporting a wheel 46. The truck 40 has a stirrup 47 pivotally connected thereto by a pin 48 and the stirrup pivotally supports a concave plate 49 engaged in a slot 50 in the stirrup. The plate 49 is apertured to receive a threaded bolt 51 to which fastening plate structure 52 may be pivotally secured and to which the door or panel is attached, as shown in FIG. 7.

The conveyor track, as shown in connection with the track 4 in FIG. 7, may have its top apertured at spaced positions along its length to receive fastening members 53 which secure the track to a supporting frame.

Referring more particularly to the wheels 43 and 46 of a trolley, these wheels have surfaces shaped to engage parts of the track at either side of the track slot, as shown in FIG. 7, wherein the wheel 46 engages a part of the track at opposite sides of a slot 55 in the track 4. More particularly, the wheels have generally the shape of an oblate spheroid to co-act with the track of circular cross-section, and have an annular protruding rib 56 which loosely travels in the track slot such as the slot 55 of the track 4.

With the tubular track and co-acting trolley wheel structure, a trolley has a direct path which is straight ahead at the slot junction 28 of the track curve 10. This action is due to the downward weight on the trolley without the application of lateral forces tending to divert the trolley and further that the leading wheel of a trolley passes onto the common segment 33 of the track curve underside while still in contact with the lower side of track side wall 24 which continues in a straight path as does the part of common segment 33 formed by the first branch track section 21.

In order to divert a trolley onto the second branch track section 22, those trolleys that are to be diverted each have a cam follower roller 60 rotatably supported on an arm 61 attached to the trolley stirrup 47 by suitable means, such as welding. The cam follower 60 is slightly in advance of the surface of the leading trolley wheel 43 as shown in FIGS. 5 to 7, and is located externally of the second branch track section 22 and at the level thereof to have the external surface of the branch track section function as a cam to exert a force on the follower 60 and thus on the trolley in the same direction as the direction in which the second branch track section diverges away from the first branch track section 21. This causes the leading trolley wheel 43 to move onto the branch track section 22 and along the slot 27 formed therein.

Referring back to FIGS. 1 to 3, it will be seen that all of the trolleys 7 have a cam follower 60 to cause the door sections 3 to move from the track 5 to the track 4 in moving from the position shown in FIG. 2 to the position shown in FIG. 1, while the trolley 9 which does not take the branch section 22 does not have the cam follower 60. Movement of the door sections 3 in the opposite direction is initiated by movement of the trolley 9 away from the building opening and the trolleys 7 then move onto the track curve 10 and subsequently to the track 5 without the necessity for any pivoted track section or pivoted switch members.

In the embodiment of FIG. 4, a series of doors or partition panels 65 travels between in line positions along a main track 66 which supports the doors in positions to span an area and a storage area having spaced apart storage tracks 67 and 68, the foregoing tracks being of the construction previously described.

A track curve 10 is situated between the main track 66 and the storage track 68 while the branch track section 21 of the curve 10 is connected to the storage track section 67 by a curved continuation 69 of the branch track section 21. Each of the doors 65 is supported by a pair of trolleys 70 and 71 with the trolley 70 constituting a leading trolley and the trolley 71 constituting a trailing trolley. The leading trolley 70 is of the same construction as the trolley 7 shown in FIGS. 5 to 7 except for the omission of a cam follower 60. The leading trolley will, therefore, travel on the first branch track section 21 of the track curve 10, and will not negotiate the second branch track section 22. The trailing trolley 71 of each door 65 also corresponds to the trolley disclosed in FIGS. 5 to 7 and has the cam follower 60 whereby engagement thereof with the curved branch track section 22 will divert the trailing trolley onto the storage track 68. This structure enables movement of the doors entirely supported from an overhead track system between an in line partitioning position and a stacked storage position without the utilization of pivoted track sections or pivoted switch members.

Figures 12, 13:
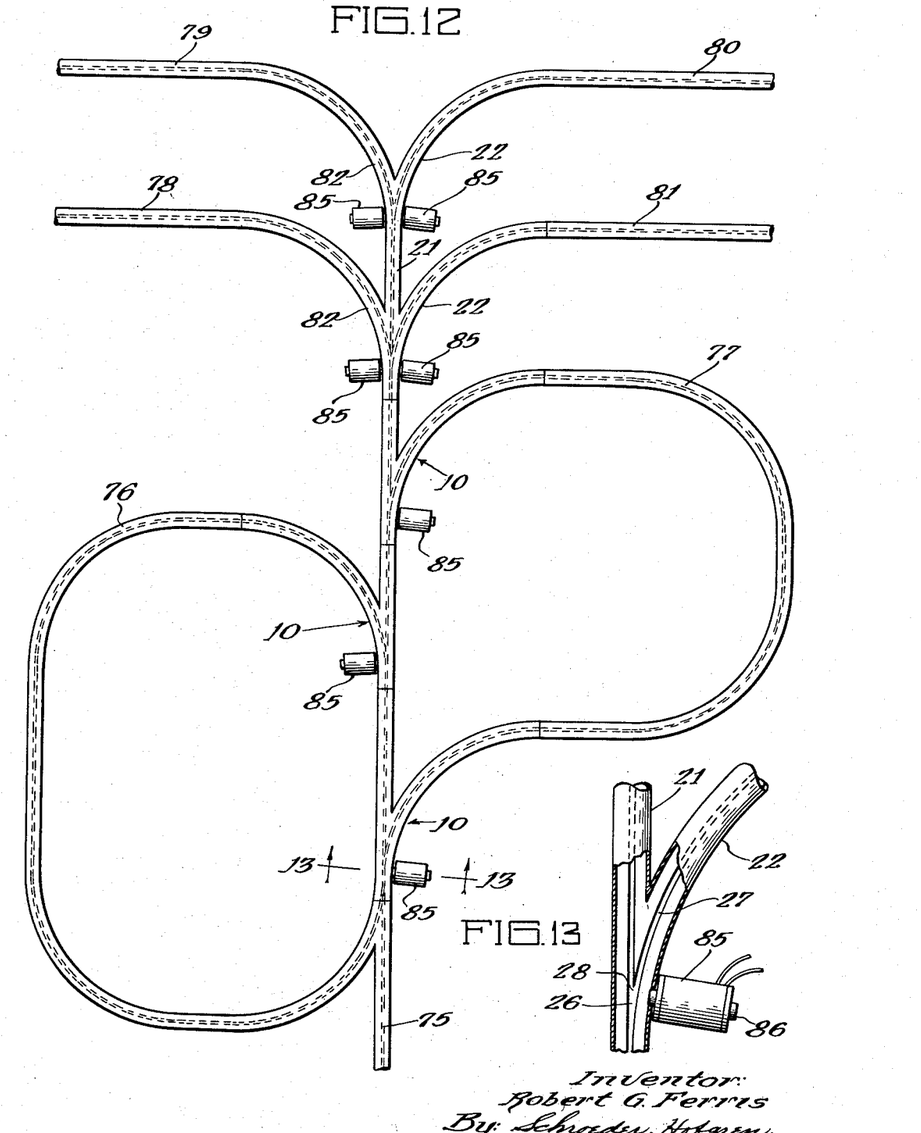
FIG. 12 is a diagrammatic plan view of the system of the present invention in another embodiment in which the trolleys may selectively follow several different paths as determined by the presence or absence of a magnetic attraction at the location of each track curve diverging branch track.
FIG. 13 is an enlarged fragmentary plan view with parts broken away of the track curve of FIG. 12 showing the magnetic mechanism.

In the embodiment shown in FIGS. 12 and 13, a main track 75 communicates with several subsidiary track systems as indicated at 76, 77 and 78 to 81, and track structure corresponding to that previously described is utilized including the tubular track with slotted undersides in which trolleys having wheels are mounted. This system provides great selectivity as to the path which a trolley may follow and has the track curves 10 located to connect the main track 75 with the branch system 77 and another track curve 10 to connect the main track 75 with the branch system 76. The main track 75 is connected with the branch systems 78 and 81 by a compound track curve in which a branch section 82 diverges from the straight line branch section 21 in addition to the diverging branch track section 22. Another compound track curve connects the main track section 75 to the branch systems 79 and 80 in which the diverging branch track sections 22 and 82 are utilized and the main track section terminates. In such a system the trolley, as shown in FIGS. 5 to 7, may be utilized, but with the omission of the cam follower 60 since the cam follower could not selectively pass a diverging branch track section 22. In order to obtain the selective diversion of a trolley, each of the track curves is provided with a solenoid 85 positioned adjacent thereto with a core 86 extending through the wall of the track to a position adjacent the merger point 28 of the track slots 26 and 27. This solenoid, when de-energized, will permit a trolley to travel a straight path in the tubular track, but upon energization thereof, will exert a magnetic attraction upon the leading wheel of the trolley having magnetically permeable material so as to divert the trolley onto the diverging branch track section 22.

With this arrangement, an operator at a remote location may have a control panel in which all of the solenoids are connected in individual circuits and the operator may determine the path that a trolley will follow by energizing the necessary solenoids 85. It will be seen that the trolley will follow a straight line path until the curves or diverging branch sections 22 and 82 leading to the systems 79 and 80 are reached if no solenoid is energized. At this point one or the other of the solenoids 85 will be energized to direct the trolley into either the system 79 or 80.

Figures 14, 15, 16:
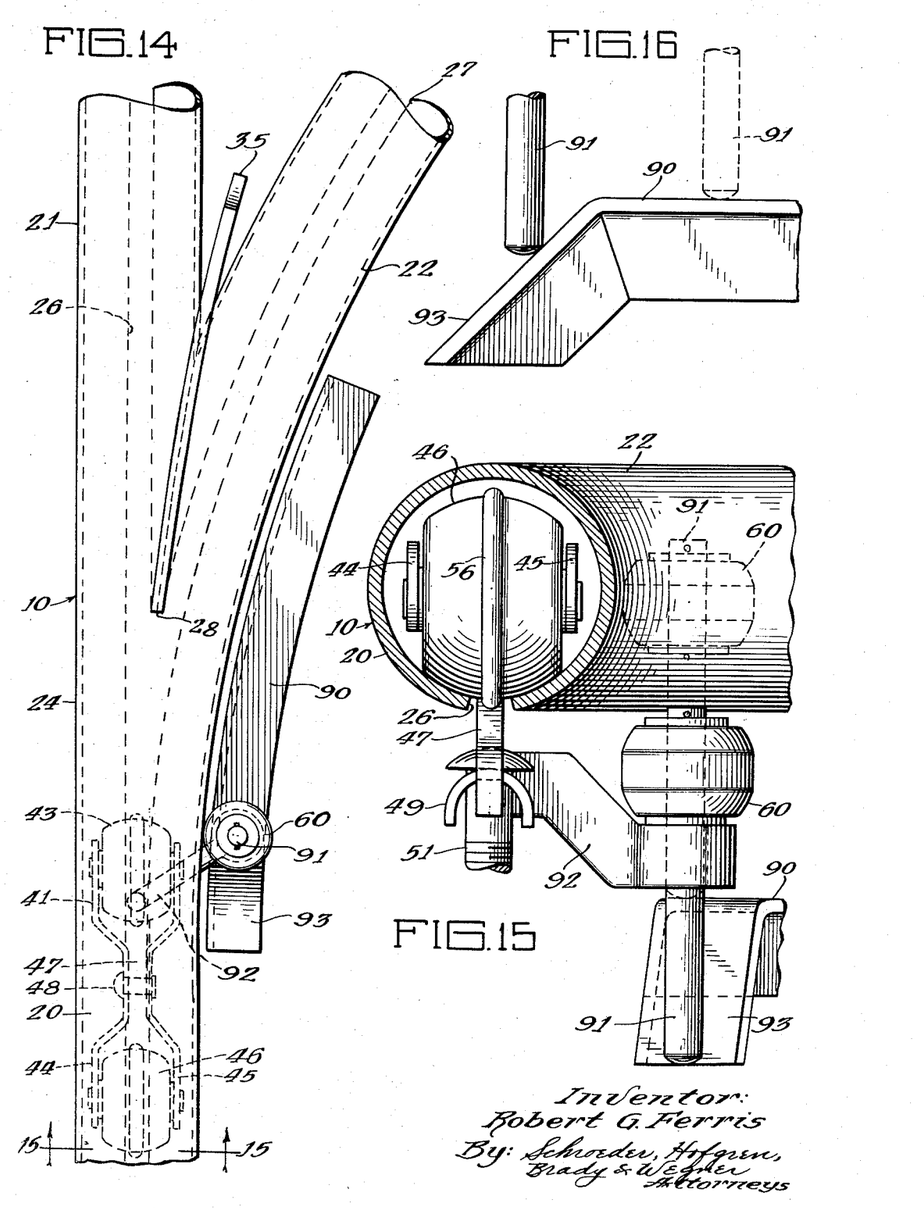
FIG. 14 is a fragmentary plan view of another embodiment of the system of this invention having a selectively movable cam follower.
FIG. 15 is a section taken generally along the line 15—15 in FIG. 14 and showing the cam follower in operative position in dotted line and in a remote position in full line.
FIG. 16 is a diagrammatic elevational view showing the co-action of the cam and an actuator for the selectively movable cam follower.

In the embodiment of FIGS. 14 to 16, a construction is provided utilizing a trolley with a cam follower which may pass by several track curves 10. In this embodiment, a cam 90 having a curvature similar to the diverging branch track section 22 of the track curve 10 is disposed adjacent thereto and at a level beneath the track curve. The cam co-acts with a support pin 91 to which the follower roller 60 is attached. The pin 91 is slidably mounted in an arm 92 attached to a trolley similar to that shown in FIGS. 5 and 7. As a trolley approaches the curve 10, the pin 91 will engage an inclined end 93 of the cam 90 to move the follower 60 from the full line position of FIG. 15 to a higher operative position, as shown in dotted line in FIG. 15, in which the follower is at the level of the diverging branch track section 22 to obtain the same cam action by the exterior surface of the track section 22 as described in connection with FIGS. 1 to 3. The contact of the follower 60 with the exterior surface of the branch track section 22 is maintained by the arcuate length of the cam 90.

The movable cam follower provides an arrangement whereby the trolley can pass any number of track curves 10 until the pin 91 contacts the cam 90 and the follower 60 is lifted into operative position.

Figures 17, 18:
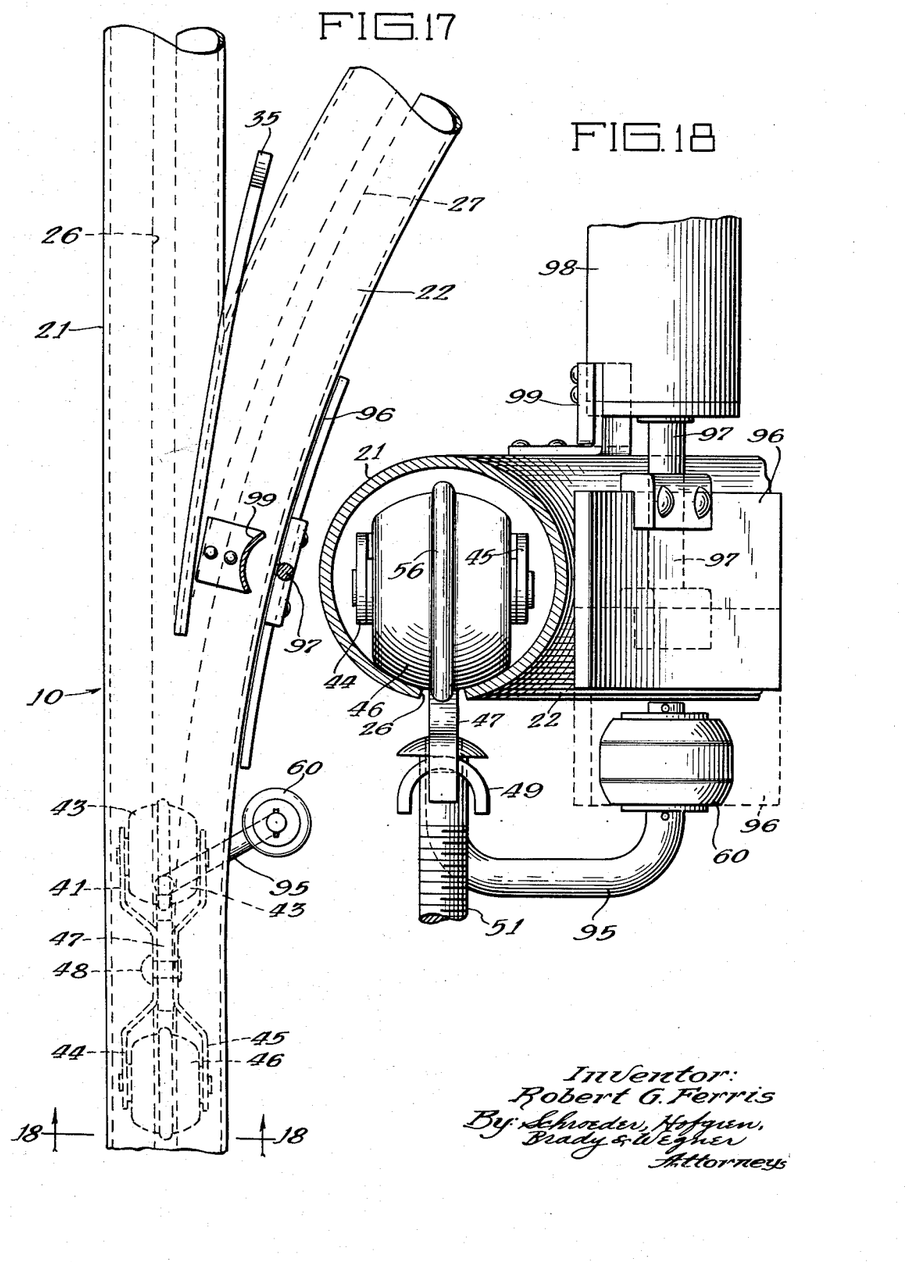
FIG. 17 is a fragmentary plan view similar to FIG. 14 of another embodiment of the track curve in which the control cam is movable for providing selective diversion of a trolley.
FIG. 18 is a vertical section taken generally along the line 18—18 in FIG. 17.

Another embodiment of this structure for obtaining a selective diversion of the trolley in a system such as shown in FIG. 12 is shown in FIGS. 17 and 18 in which the cam follower 60 is supported from the trolley by an arm 95 at a level beneath the track curve branch section 22. A control cam 96 is carried by a solenoid armature 97 of a solenoid 98 supported from the track by a bracket 99. The solenoid controls the position of the cam 96 to have the cam in an operative position, as shown in dotted line in FIG. 18, at the level of the cam follower 60 or at an elevated position remote from the cam follower 60.

When the cam 96 is in its lowered operative position, the cam follower 60 will engage the cam, and due to the curvature of the cam corresponding to the diverging branch track section 22, will cause the trolley to move onto the diverging track section. If a trolley approaches the track curve 10 and the cam is out of operative position, there will be no engagement of the cam follower 60 and the trolley continues along a straight line path along the branch section 21.

In the embodiment shown in FIGS. 19 to 24, the system has a main track 100 overlying the area in which a series of panels is situated when in operative position and has a straight section 101 extending to one side of the area and along a storage area. A series of track curves 10 is associated in this system with the diverging branch track sections 22 of the track curves leading to three congruent storage branch tracks 102, 103 and 104. A fourth storage branch track 105 curvingly connects to the end of the straight main track section 101. The main track section 101 includes the first branch tracks 21 of the track curves 10.

Figure 20:
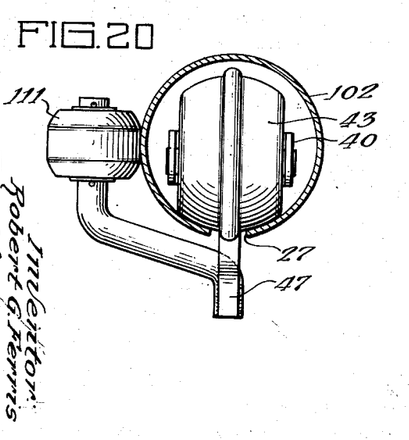
FIG. 20 is a vertical section on an enlarged scale taken generally along the line 20—20 in FIG. 19.
Figure 21:
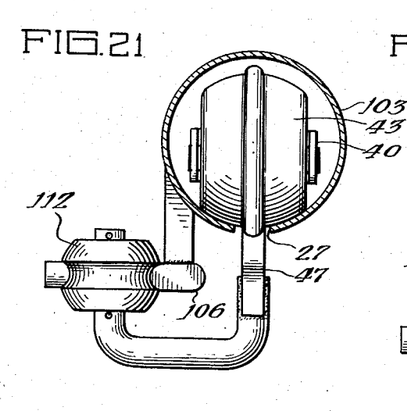
FIG. 21 is a vertical section on an enlarged scale taken generally along the line 21—21 in FIG. 19.
Figure 22:
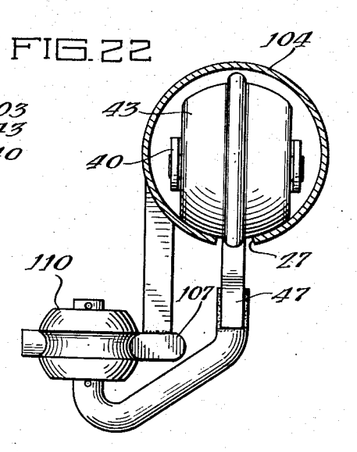
FIG. 22 is a vertical section on an enlarged scale taken generally along the line 22—22 in FIG. 19.
Figures 23, 24:
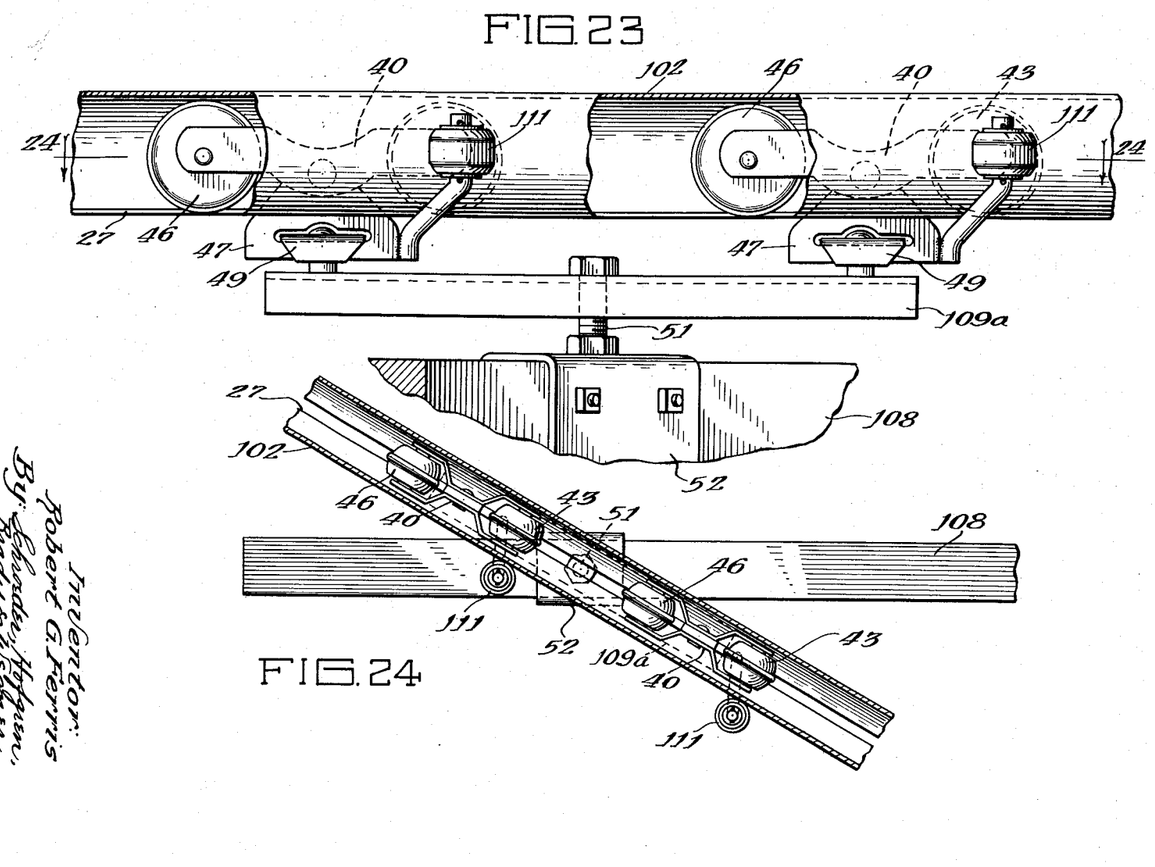
FIG. 23 is a fragmentary front elevation on an enlarged scale with parts broken away of a door and its support by a double truck trolley and taken generally along the lines 23—23 in FIG. 19.
FIG. 24 is a plan section taken generally along the line 24—24 in FIG. 23.

As shown in FIGS. 20, 21 and 22, the three track curves 10 each have a cam surface associated therewith with the cam surface of the track curve 10 associated with the storage track 102 being the external surface of the diverging branch track 22. The cam surface of the track curve 10 associated with a storage branch track 103 is an arcuate cam 106 depending from the diverging branch track section 22 of the track curve and the cam of the track curve 10 associated with the storage branch track 104 is a cam 107 similar to cam 106 but again at an even lower level.

Figure 19:
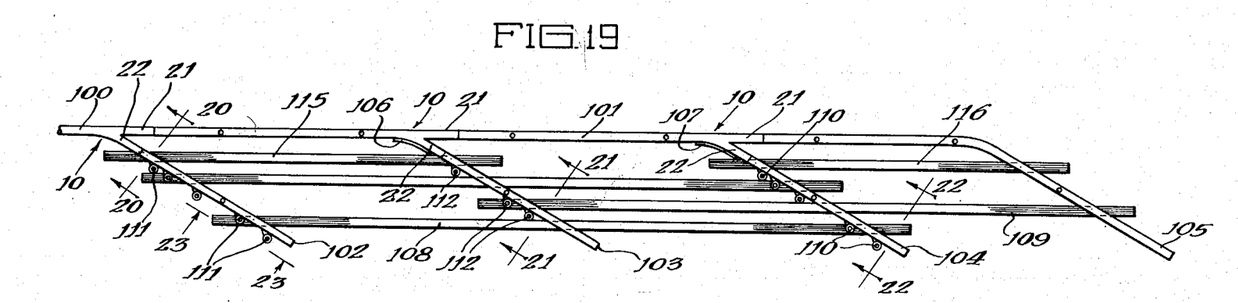
FIG. 19 is a diagrammatic plan view of another embodiment of the invention embodying a plurality of track curves for supporting extra heavy doors by double truck trolleys and supporting other alternate doors on different storage branch tracks to provide flexibility in placing of the doors on the main line track.

In one application of this system, doors of a substantial size, such as the doors 108 and 109, are supported by trolleys having a hanger bar 109a with a pair of spaced apart wheel trucks 40 to handle the weight of the doors. These hangers are of a length substantially greater than the width of a panel whereby it is desirable to stagger the mounting of door trolleys in the storage tracks to obtain close spacing of the doors. For this purpose, the door 108 has both trucks 40 provided with a cam follower 110 at a level to engage the cam 107, as shown in FIG. 22, while the trailing trolley has a cam follower 111 with each truck 40 at the level of the diverging track section 22 whereby the door will travel onto the storage track sections 102 and 104. The leading trolley of door 109 does not have cam followers, so it will move onto the track section 105 without diversion, while the trailing trolley has a cam follower 112 at the level of the cam 106 associated with each trolley truck to move onto the storage track section 103. This enables the doors to be stacked in positions close to each other due to the staggering of the oversized trolleys which would not be the case if the trolleys for all doors were on the same tracks.

Another utilization of this arrangement or embodiment is shown by the doors 115 and 116 in which the door 116 has its leading trolley without any cam follower and the trailing trolley has a cam follower 110 whereby to engage the cam 107 and move onto the storage branch track 104. The other door 115 has its leading trolley provided with a cam follower 112 to engage the cam 106 and move onto the storage branch track 103 while the trailing trolley has a cam 111 to engage the diverging branch track section 22 and move onto the storage track 102. This arrangement enables the selective withdrawal of doors from the storage area to provide a desired alignment along the main track 100 which is a desirable feature in connection with stage settings and many other uses.

In the foregoing description, the track curve 10 has been described as the unitary element. It is believed clear that the diverging branch track section 22 thereof may constitute a portion of whatever track is connected thereto and forms a continuation thereof.

The foregoing detailed description is given for clearness of understanding only, and no unnecessary limitations should be understood therefrom, as modifications will be obvious to those skilled in the art.

I claim:

1. A door structure free of bottom support comprising, in combination, a first track extending along a path overlying an area to be spanned by the door structure and having a straight section extending beyond said area, a track curve having a first branch track section forming part of said straight section and a second branch track curvingly diverging away from said straight section, a third branch track forming a continuation of the first track curving congruently with and spaced from said second branch track, said tracks having a tubular cross-section and slotted along their underside whereby the first and second branch track slots merge into the first track slot at a junction, and a common section of track between the merging slots tapering to an end at said junction, a plurality of door sections each having a pair of spaced door hangers supporting the door section from the track, each hanger including a two-directional trolley with a pair of rigidly interconnected wheels disposed within the track and a stirrup extending through the slot, said wheels being of a size to pass the junction and engage the common track section and a part of the first branch track section while still engaging the first track to travel along said straight section, and means associated with the trailing hanger of each door section for diverting the wheels of said trailing hanger at said junction onto said second branch track, whereby each door section may be moved from the first track to said second and third branch tracks for stacking side-by-side by the leading door hanger traveling past the junction onto the third branch track and the trailing hanger being diverted onto the second branch track, each of said hangers having a pivotal connection with the associated door section whereby a trolley is in line with a door when the door is in area spanning position and extends transverse thereto when the door sections are stacked, the radius of curvature of said second branch track section being sufficiently large to accommodate a trolley with two spaced rigidly interconnected wheels and beginning at a distance from the end of said common section approximately equal to the length of the trolley to gradually increase the width of the track and the slot in advance of said end whereby the stirrup and trailing trolley wheel do not interfere with diverting of the trolley.

2. A door structure as defined in claim 1 wherein the diverting means comprises, a follower supported from the stirrup outside the track and at the level thereof in a position in advance of the lead wheel of the trailing hanger, said follower being at the side of the track from which said second branch track diverges whereby the follower engages the second branch track and causes the wheels of the trailing hanger to pass onto the second branch track.

3. A door structure as defined in claim 2 wherein said tubular track has a circular cross-section and said wheels are shaped to rest upon the portions of the track adjacent the track slot.

References Cited in the file of this patent

UNITED STATES PATENTS

| | | | |
|---|---|---|---|
| 305,060 | Downing | | Sept. 16, 1884 |
| 2,732,966 | Schroeder | | Jan. 31, 1956 |
| 2,904,852 | Davis | | Sept. 22, 1959 |

FOREIGN PATENTS

| | | |
|---|---|---|
| 568,332 | France | Dec. 20, 1923 |
| 624,907 | Germany | Jan. 30, 1936 |
| 814,568 | France | Mar. 22, 1937 |
| 679,094 | Germany | July 28, 1939 |
| 374,684 | Italy | Sept. 5, 1939 |
| 955,968 | France | July 4, 1949 |
| 499,346 | Belgium | Mar. 1, 1951 |
| 942,965 | Germany | May 9, 1956 |